United States Patent
Akiyama et al.

(10) Patent No.: US 8,389,173 B2
(45) Date of Patent: Mar. 5, 2013

(54) METHOD FOR ACTIVATING FUEL CELL

(75) Inventors: Takashi Akiyama, Suita (JP); Yukihiro Okada, Katano (JP); Satoshi Shibutani, Hirakata (JP); Hideyuki Ueda, Ibaraki (JP); Masahiro Takada, Shizuoka (JP)

(73) Assignee: Panasonic Corporation, Osaka (JP)

( * ) Notice: Subject to any disclaimer, the term of this patent is extended or adjusted under 35 U.S.C. 154(b) by 1858 days.

(21) Appl. No.: 11/116,288

(22) Filed: Apr. 28, 2005

(65) Prior Publication Data

US 2006/0019131 A1 Jan. 26, 2006

(30) Foreign Application Priority Data

Jul. 23, 2004 (JP) ................... 2004-215257

(51) Int. Cl.
*H01M 8/04* (2006.01)
*H01M 8/10* (2006.01)
(52) U.S. Cl. .......... 429/445; 429/428
(58) Field of Classification Search ............. 429/13, 429/428–429, 443, 445
See application file for complete search history.

(56) References Cited

U.S. PATENT DOCUMENTS

| | | | | |
|---|---|---|---|---|
| 5,601,936 A | * | 2/1997 | Dudfield et al. | 429/13 |
| 5,981,096 A | * | 11/1999 | Hornburg et al. | 429/17 |
| 6,218,035 B1 | * | 4/2001 | Fuglevand et al. | 429/30 |
| 6,387,559 B1 | * | 5/2002 | Koripella et al. | 429/34 |
| 6,509,112 B1 | * | 1/2003 | Luft et al. | 429/13 |
| 6,596,422 B2 | | 7/2003 | Ren | |
| 6,730,424 B1 | | 5/2004 | He et al. | |
| 6,838,199 B2 | * | 1/2005 | Balliet et al. | 429/13 |
| 2002/0076582 A1 | * | 6/2002 | Reiser et al. | 429/13 |
| 2004/0144579 A1 | * | 7/2004 | Hasuka et al. | 180/65.3 |

FOREIGN PATENT DOCUMENTS

JP 06-196187 7/1994

OTHER PUBLICATIONS

Chinese Office Action issued in corresponding Chinese Patent Application No. CN 2005100818567, dated Aug. 25, 2006.

* cited by examiner

*Primary Examiner* — Gregg Cantelmo
(74) *Attorney, Agent, or Firm* — McDermott Will & Emery LLP

(57) ABSTRACT

A method for activating a direct oxidation fuel cell including an anode, a cathode, and a proton-conductive electrolyte membrane interposed between the anode and the cathode is provided. The anode and the cathode each have a catalyst layer on a face in contact with the proton-conductive electrolyte membrane. This method activates the fuel cell by passing a current through the fuel cell from an external power source, with the positive electrode and the negative electrode of the external power source connected to the anode and the cathode of the fuel cell, respectively, while supplying an organic fuel and an inert gas to the anode and the cathode, respectively.

1 Claim, 2 Drawing Sheets

METHOD FOR ACTIVATING FUEL CELL

BACKGROUND OF THE INVENTION

The present invention relates to a method for activating fuel cells, particularly direct oxidation fuel cells, which directly utilize organic fuel.

Fuel cells are classified into phosphoric acid type, alkaline type, molten carbonate type, solid oxide type, solid polymer type, etc., according to the kind of the electrolyte they use. Among them, solid polymer fuel cells, which are characterized by low-temperature operation and high output density, are becoming commercially practical in such applications as automobile power sources and domestic cogeneration systems.

Meanwhile, the functions of portable devices, such as notebook personal computers, cellular phones, and personal digital assistants, are becoming increasingly more sophisticated, and the electric power consumed by such devices tend to increase commensurately. Under such circumstances, it is feared that improvements in energy density of lithium ion secondary batteries and nickel-metal hydride secondary batteries, which are currently the power sources for portable devices, are unable to keep up with the increase in power consumption, thereby shortly causing a problem of capacity shortage of such power sources.

As the power source to solve this problem, solid polymer fuel cells (hereinafter referred to as "PEFCs") have been receiving attention. Among them, most expected are direct oxidation fuel cells, which can generate electric energy by directly oxidizing a liquid fuel at ordinary temperature at the electrode without the need to reform it to hydrogen, because they require no reformer and can be readily miniaturized.

Low-molecular-weight alcohols and ethers have been examined as the fuel for direct oxidation fuel cells. Among them, most promising is methanol, which offers high energy density and high output. Fuel cells that use methanol as the fuel are called direct methanol fuel cells (hereinafter "DMFCs").

The anode reaction and the cathode reaction of a DMFC are represented by the following equations (1) and (2), respectively. Oxygen serving as the oxidant at the cathode is commonly taken from air.

$$CH_3OH + H_2O \rightarrow CO_2 + 6H^+ + 6e^- \quad (1)$$

$$3/2 O_2 + 6H^+ + 6e^- \rightarrow 3H_2O \quad (2)$$

The ion-conductive electrolyte membrane, which transfers protons produced at the anode to the cathode, is often a perfluorosulfonic acid membrane, such as Nafion (registered trademark), in the same manner as in PEFCs utilizing hydrogen as the fuel. Also, such an electrolyte membrane usually has, on each side, a catalyst layer including a catalytic substance. This catalyst layer is generally prepared, with the aim of ensuring proton conductivity, by applying a mixture of a catalytic substance and a solution containing a perfluorosulfonic acid, which is the same component as that of the electrolyte membrane, and drying the mixture.

Solid polymer type electrolyte membranes that are currently used exhibit sufficient ionic conductivity only when they are hydrated. It is thus necessary to hydrate the electrolyte membrane in a process of fabricating a fuel cell. However, a polymer electrolyte membrane absorbs or desorbs water relatively promptly, depending on the ambient temperature and humidity environment, and undergoes dimensional changes accordingly. Hence, it is extremely difficult to fabricate a fuel cell, with its polymer electrolyte membrane hydrated.

For this reason, a fuel cell is often subjected to a hydration treatment, called an activation treatment, after it has been fabricated, with its electrolyte membrane being in a dry state, to the extent that dimensional changes of the electrolyte membrane would cause no special problem.

When a fuel cell is left unused for a long period of time, with the gas communication with the outer environment blocked off, or without any humidification measures such as the supply of moisture to the electrolyte membrane, the proton conductivity of the electrolyte membrane lowers remarkably. In this case, the manipulation of re-supplying moisture to the electrolyte membrane, i.e., activation may become necessary as well.

Such an activation method is described in Japanese Laid-Open Patent Publication No. Hei 6-196187. According to this proposal, while humidified hydrogen gas and humidified oxygen gas are supplied to the anode and the cathode, respectively, a voltage of 1.3 V or more is applied between the two electrodes. The resultant electrolysis of water in the electrolyte membrane produces hydrogen and oxygen to cause a large increase in the concentration gradient of water, thereby increasing the diffusion speed of water. As a result, the electrolyte membrane is promptly hydrated according to this method.

Also, another method is proposed in U.S. Pat. No. 6,596,422. First, humidified hydrogen gas and air are supplied to the anode and the cathode, respectively, for power generation, and then, methanol fuel and air are supplied to the anode and the cathode, respectively, for operation.

As described above, various proposals have been made to hydrate the electrolyte membrane, but to perform an operation requiring humidified hydrogen, hydrogen supply equipment and hydrogen-humidifying equipment are necessary. Generally, hydrogen gas is highly flammable and has a wide explosion limit concentration range, so that it must be handled with great attention. Therefore, there is a need to incorporate sufficient safeguard equipment into a manufacturing process that may possibly use large amounts of hydrogen.

The manufacturing process of PEFCs using hydrogen as the fuel inherently has such equipment. However, in the manufacturing process of DMFCs, which are expected to be mass-produced as the power sources for portable devices, the manufacturing facilities need to be simplified as much as possible, and hence such equipment requiring hydrogen is undesirable.

The method of electrolyzing water in an electrolyte membrane requires application of a voltage of 1.3 V or more per unit cell. Thus, a problem of this method is that if the number of cells of a fuel cell stack is increased, the voltage applied to the fuel cell stack becomes high.

Further, the present inventors believe that the following problems should also be resolved.

The catalyst used in direct oxidation fuel cells is typically platinum, a compound thereof, or a mixture thereof. While platinum is a substance that is inherently resistant to oxidation, it is known that its surface is easily oxidized if baked at high temperatures in an atmosphere containing oxygen. It is therefore considered that such oxidation of platinum decreases the number of effective active sites for reaction.

Such oxidation is unlikely to occur in the manufacturing process of a catalyst for fuel cells, since the catalyst is baked at high temperatures in an inert atmosphere or a reducing atmosphere, but the decrease in the number of active sites due to the oxidation of platinum surface occurs in the manufacturing process of fuel cells, for example, for the following reason.

As described above, a catalyst layer is composed of a catalytic substance and an electrolyte substance, but a mere application of a mixture of these two substances does not facilitate the proton transfer at the interface between the electrolytes in the catalyst layer or the interface between the electrolyte in the catalyst layer and the electrolyte membrane. To improve such proton transfer, it is common to perform a hot pressing process in which the mixture is heated to a temperature equal to or higher than the glass transition point of the electrolyte and pressed, in order to enhance the joint between the electrolytes. While such a process is usually performed for a short period of time of several minutes, it may be performed for a relatively long period of time at high temperatures. This process can possibly promote the oxidation of platinum surface by the oxygen in air.

Further, platinum surface can be oxidized not only in the fabrication process of a fuel cell but also during the use or storage of a fuel cell, because a cathode catalyst in particular is exposed to a relatively high potential in the presence of oxygen for an extended period of time, or hydrogen peroxide, which is a strong oxidant, is produced as an intermediate product of a side reaction at the cathode.

Regarding the above-mentioned problems, there have been no activation methods that perform a regeneration treatment specifically and effectively.

It is therefore an object of the present invention to solve the above-mentioned problems, enable initial activation of a fuel cell upon its fabrication and reactivation after a long-time suspension of its operation, and provide a fuel cell with sufficient activity at low costs.

BRIEF SUMMARY OF THE INVENTION

The present invention provides a method for activating a direct oxidation fuel cell including an anode, a cathode, and a proton-conductive electrolyte membrane interposed between the anode and the cathode. The anode and the cathode each have a catalyst layer on a face in contact with the proton-conductive electrolyte membrane. This activation method is characterized in that a current is passed through the fuel cell from an external power source, with the positive electrode and the negative electrode of the external power source connected to the anode and the cathode of the fuel cell, respectively, while an organic fuel and an inert gas are supplied to the anode and the cathode, respectively.

The present invention enables the fuel cell to be activated when it is fabricated and to be reactivated after its operation is stopped for a long period of time, without introducing hydrogen supply equipment, additional safeguard equipment as required, or gas-humidifying equipment.

For example, in a DMFC that uses methanol as the fuel, according to the present invention, on the anode, the supplied fuel is oxidized to release protons and electrons, as shown in the equation (1). The protons migrate to the cathode through the electrolyte membrane and recombine with the electrons to produce hydrogen gas. This reaction is given in the following equation (3).

$$2H^+ + 2e^- \rightarrow H_2 \quad (3)$$

In this process, the electro-osmotic drag of water and methanol by the protons in the electrolyte membrane is facilitated, so that the whole electrolyte membrane is hydrated and becomes moist. Thus, the activation is completed more promptly than when the electrolyte membrane is simply immersed in water.

In this case, since a voltage is applied by the external power source to the fuel cell simply to promote the migration of protons, this voltage needs not to be so high as to electrolyze water.

Further, with regard to the problem of oxidation of catalyst surface, since the above-mentioned method involves production of hydrogen particularly on the cathode, the cathode has a reducing atmosphere, and oxygen or hydroxyl groups on the catalyst surface and the hydrogen are combined to produce water, which is exhausted from the cell. At this time, if the flow of the gas inside the cathode is small, the hydrogen generated does not evenly diffuse into the cell, or the water generated undesirably builds up inside the catalyst layer, thereby covering the active sites of the catalyst. Therefore, in the present invention, an inert gas is supplied to the cathode to facilitate the flow of the gas phase at the cathode.

Hydrogen is also produced in the electrode in an activation method utilizing electrolysis, as proposed in the aforementioned Japanese Laid-Open Patent Publication No. Hei 6-196187. In this case, however, hydrogen is produced at the anode, since the external power source is connected such that the cathode has a higher potential than the anode, i.e., a current flows through an external circuit from the anode to the cathode.

In contrast, according to the present invention, because the external power source is connected such that the polarity is opposite thereto, hydrogen is produced at the cathode. Hence, the operation and effect are completely different.

The fuel of a fuel cell to which the activation method of the present invention is applied is preferably methanol.

As described above, methanol is promising as the fuel of a direct oxidation fuel cell, since it has a high theoretical energy conversion efficiency, a smaller reaction overvoltage at the anode than other organic fuels, and a high output. The use of methanol makes it possible to provide a fuel cell with a high energy density which is preferable as the power source of portable electronic devices.

In the activation method of the present invention, the inert gas supplied to the cathode is preferably nitrogen.

Preferably, the voltage applied from the external power source to the fuel cell in order to activate the fuel cell is sufficient to transfer protons generated at the anode to the cathode but insufficient to oxidize anode material. Such voltage is desirably approximately 0.5 V/cell or less. Such application voltage can avoid the problem of dissolving the catalyst metal of the electrode.

Nitrogen gas does not react with protons or the constituent materials of the fuel cell at ordinary temperature, and it is contained in air in large amounts, thus being relatively inexpensive. The use of such nitrogen gas makes it possible to activate the fuel cell at lower costs than the use of other inert gases.

In a preferable embodiment of the present invention, the fuel cell is incorporated with a secondary battery or a capacitor as an auxiliary power source, to form a fuel cell system, and the auxiliary power source is used as the external power source for activation.

According to this embodiment, in activating the fuel cell, there is no need for the user of the fuel cell system to purchase an external power source. Thus, the activation treatment can be performed simply by introducing an inert gas.

As described above, the present invention enables prompt hydration of the electrolyte membrane and the electrolyte present in the catalyst layer, in order to impart sufficient proton conductivity, without introducing hydrogen supply equipment or gas-humidifying equipment, both of which are not inherently necessary for the operation of a direct oxidation fuel cell, to the manufacturing process of the fuel cell.

Further, the present invention can heighten the activity of a catalyst by removing oxide film formed on the surface of the catalyst in a manufacturing process of a fuel cell or when the fuel cell is used or stored for a long period of time.

Accordingly, the capital investment in the manufacture of direct oxidation fuel cells can be reduced, so that a fuel cell can be activated upon its fabrication and reactivated after its operation is stopped for a long period of time at low costs. It is thus possible to provide a direct oxidation fuel cell with sufficient activity at low costs.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A fuel cell to which the present invention is applied is a direct oxidation fuel cell including an anode, a cathode, and a proton-conductive electrolyte membrane interposed between the anode and the cathode. The anode and the cathode each have a catalyst layer on a face in contact with the proton-conductive electrolyte membrane.

The activation method of the present invention includes passing a current through the fuel cell from an external power source, with the positive electrode and the negative electrode of the external power source connected to the anode and the cathode of the fuel cell, respectively, while supplying an organic fuel and an inert gas to the anode and the cathode, respectively.

Referring now to drawings, embodiments of the present invention are more specifically described.

Embodiment 1

Figure 1:
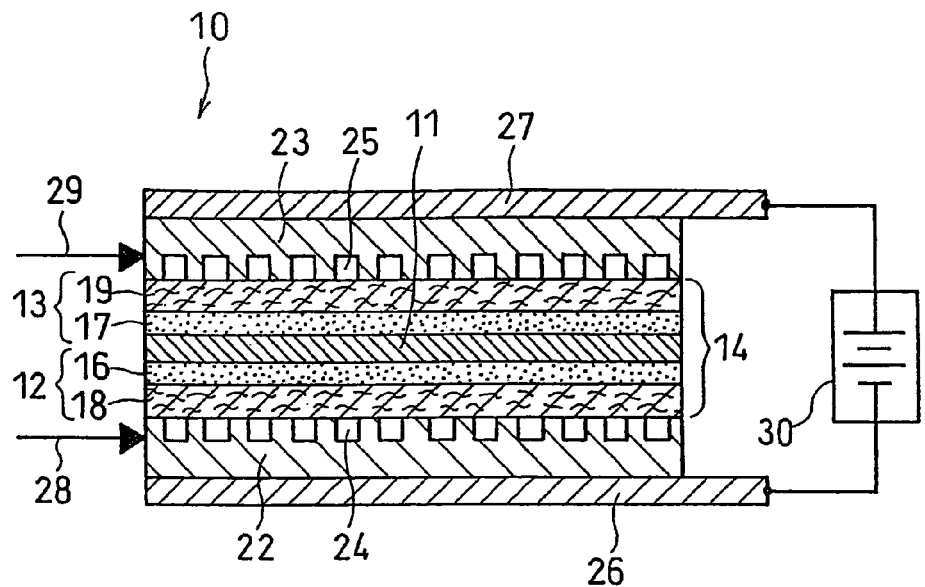
FIG. 1 is a schematic view showing the connection between a fuel cell according to an embodiment of the present invention and an external power source for activating the fuel cell.

FIG. 1 is a schematic view showing the connection between a fuel cell according to an embodiment of the present invention and an external power source for activating the fuel cell. For the purpose of simplification, the fuel cell illustrated in FIG. 1 is a cross-sectional view of only the main part of a unit cell. Since the voltage of a unit cell of a direct oxidation fuel cell is usually 0.7 V or less, in actuality it is common to connect a plurality of unit cells in series to form a stack.

A fuel cell 10 has a membrane electrode assembly (MEA) 14, which includes a polymer electrolyte membrane 11, a cathode 12 disposed on one face of the polymer electrolyte membrane, and an anode 13 disposed on the other side of the polymer electrolyte membrane. The cathode 12 and the anode 13 are composed of catalyst layers 16 and 17 in contact with the polymer electrolyte membrane 11, and diffusion layers 18 and 19, respectively. The MEA 14 is sandwiched between a cathode-side separator 22 and an anode-side separator 23. The separator 22 has, on the face opposing the cathode 12, a gas flow channel 24, while the separator 23 has, on the face opposing the anode 13, a fuel flow channel 25. The unit cell with the above-described structure is sandwiched between current collector plates 26 and 27.

A powder of a noble metal catalyst, typically platinum, is used as the catalyst of the catalyst layer. A metal fine powder, called "black", is used in some cases, and a metal fine powder highly dispersed and carried on carbon powder is used in other cases. As the anode catalyst, a platinum-ruthenium alloy or the like is used to reduce the poisoning of active sites in a reaction system containing e.g. methanol, where carbon monoxide is produced as an intermediate product in the fuel oxidation process. Such a catalyst powder is mixed with a solution or dispersion containing a polymer electrolyte, typically Nafion (registered trademark), to form a paste, and the paste is applied onto the surface of an electrolyte membrane and is then fixed by hot-pressing or the like, to form a catalyst layer.

The diffusion layer disposed on the outer side of the catalyst layer is usually made of a carbon paper or carbon cloth, which has a high electric conductivity and a high porosity. The separators 22 and 23 are usually formed of a substance containing a carbon material, such as graphite. The flow channels 24 and 25 are normally grooves cut in the separator surface. While the structure of the flow channel is varied according to the design of fuel cells, the simplest form of the flow channel is composed of a plurality of parallel, straight grooves that are rectangular in cross section.

The current collector plates 26 and 27 are composed of a substance with a small specific resistance, such as copper, in order to promptly conduct electrons from the separators 22 and 23 to an external circuit. To reduce contact resistance, their surfaces are often plated with gold.

A fuel is supplied to the anode 13 of the fuel cell 10, using, for example, a pump, as indicated by an arrow 29. Together with the fuel, water is supplied, since the electrode reaction at the anode often requires water, as shown by the reaction formula (4), though it depends on the kind of the fuel. Particularly, in the case of e.g. Nafion (registered trademark), which is an electrolyte membrane currently used widely, if a high-concentration fuel aqueous solution is supplied to the anode, the fuel permeates the electrolyte membrane (so-called "cross over"), thereby causing a significant drop in battery voltage. Thus, a diluted solution with a fuel concentration of 30% by weight or less is often supplied.

$$CH_3OH + H_2O \rightarrow CO_2 + 6H^+ + 6e^- \quad (4)$$

An arrow 28 represents a gas supply route to the cathode 12. For power generation by the fuel cell, an oxidant gas, usually air, is supplied. For the activation treatment of the present invention, an inert gas is supplied to the cathode through this gas supply route 28. As described above, nitrogen gas is preferred in view of the cost of the gas. The suitable supply amount varies with cells, since it is subject to various factors, such as the material of the electrolyte membrane, the porosity of the cathode gas diffusion layer, and the shape of the separator flow channel. However, if the inert gas is supplied excessively, the electrolyte membrane will be dried, thereby impeding the hydration of the electrolyte membrane, which is the object of the present invention. Thus, a relatively small amount is desirable. With respect to the upper limit of the gas supply amount, the internal resistance of the cell is measured with an impedance meter or the like, and the upper limit can be set to a range in which the impedance is not increased by the supply of gas.

The inert gas used therein may be either unhumidified (moisture-free) or humidified by bubbling in distilled water or the like. In terms of reducing capital investment and manufacturing costs, which is intended by the present invention, it is suitable to supply unhumidified gas. However, depending on the material of the electrolyte membrane, supply of unhumidified gas may cause the electrolyte membrane to significantly lose its moisture, thereby drying out the electrolyte membrane during the activation treatment. In this case, it is preferred to supply humidified inert gas.

In performing the activation treatment, the fuel cell or stack is connected to an external power source 30, and a current is passed therethrough in such a direction that protons move from the anode to the cathode, i.e., the current flows from the cathode to the anode through the external circuit. At this time, a reaction of producing hydrogen from protons, as shown by the equation (5), takes place at the cathode. Thus, the potential of the cathode is almost equal to 0 V, which is the potential of a standard hydrogen electrode, whereas the potential of the anode exhibits an overvoltage resulting from the oxidation reaction of the fuel. That is, the relationship between the cell voltage and the current density upon the passage of the current from the external power source 30 is equal to the polarization characteristics of the anode.

$$2H^+ + 2e^- \rightarrow H_2 \qquad (5)$$

The control for passing a current from the external power source through the fuel cell may be performed by constant voltage control, in which the cell voltage is fixed, constant current control, in which the current value is fixed, or constant power control, in which the product of voltage and current is fixed. It is known that the amount of water movement due to electro-osmotic drag is dependent on the amount of proton migration. The protons generated at the anode, as shown in the equation (4), migrate to the cathode because of the potential gradient in the electrolyte membrane, where water is produced as shown in the equation (2). The electrons generated at the anode, as shown in the equation (4), travel to the cathode through the external circuit. At this time, the amount of proton migration and the amount of electron migration should be stoichiometrically in balance, and the amount of proton migration is proportional to the amount of current. Therefore, in order to promptly hydrate or humidify the electrolyte membrane, it is preferred to increase the current value as much as possible.

However, if the current passed through the cell is excessively increased to cause an increase in anode polarization, other substances than the fuel may be oxidized, thereby resulting in degradation in electrode performance. Hence, care should be taken. For example, in the case of using a catalyst consisting of catalyst particles carried on carbon, if the carbon is oxidized, the catalyst particles carried thereon may be separated therefrom and discharged with exhaust fuel, thereby resulting in degradation in performance. Empirically, it appears that if the voltage applied to a cell is 0.5 V or less, electrode performance does not degrade significantly in such a short time as several minutes. However, it is preferred to maintain the voltage as low as possible, while supplying the fuel sufficiently, increasing the cell temperature to some extent, and reducing the polarization of the fuel concentration diffusion.

Embodiment 2

This embodiment describes an example in which a fuel cell system is equipped with a secondary battery or capacitor as an auxiliary power source, and this auxiliary power source is used as the external power source for activating a fuel cell.

When a power supply system is formed using a fuel cell, it is preferred to incorporate a small-sized secondary battery or capacitor therein, in order to compensate for the output instability of the fuel cell and load variations. In such a system, its small-sized secondary battery or capacitor is used as the external power source for activating the fuel cell.

In this case, depending on which method of constant current, constant voltage, and constant power is used to supply electric energy for performing an activation treatment, it is necessary to incorporate a suitable control circuit therein.

Generally, the voltage generated by a unit cell of a direct oxidation fuel cell is 0.3 to 0.6 V, which is low. It is therefore common to connect a plurality of unit cells in series and use a stack. Since the output voltage of the fuel cell does not necessarily agree with the voltage necessary for charging the auxiliary power source, a DC/DC converter is often interposed between the fuel cell and the auxiliary power source in order to adjust voltage. For example, in such a case, an activation treatment can be performed under constant voltage control, by discharging the auxiliary power source such that the current through the DC/DC converter flows in the direction opposite to that during the power generation of the fuel cell.

Normally, the fuel cell is connected with the auxiliary power source such that the cathode of the fuel cell is electrically connected to the positive electrode of the auxiliary power source, and that the anode of the fuel cell is electrically connected to the negative electrode of the auxiliary power source. However, in performing an activation treatment, a current needs to be passed such that protons move from the anode of the fuel cell to the cathode, i.e., the current flows from the cathode to the anode, as described above. Therefore, it is necessary that the cathode of the fuel cell be electrically connected to the negative electrode of the auxiliary power source, and that the anode of the fuel cell be electrically connected to the positive electrode of the auxiliary power source. To enable such switching, switches or the like need to be incorporated.

Figure 3:
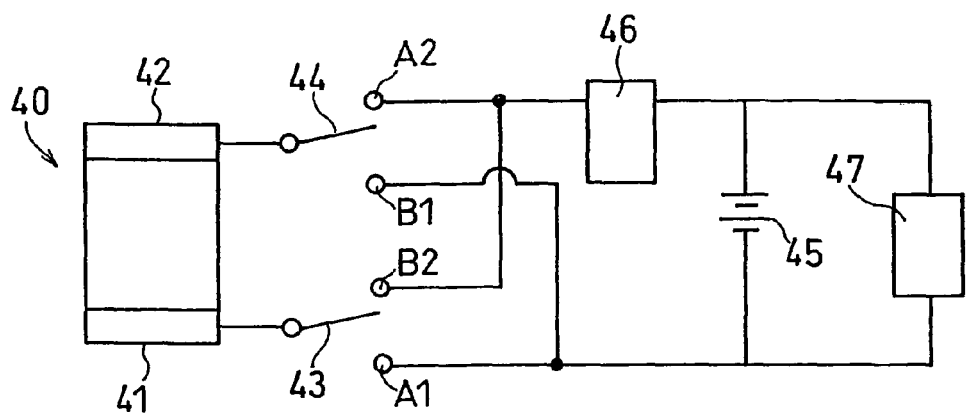
FIG. 3 is a diagram showing the circuit structure of a fuel cell system according to another embodiment of the present invention.

FIG. 3 shows a specific exemplary circuit for performing such switching. Numeral 40 represents a fuel cell or a cell stack. The fuel cell has an anode-side terminal 41 and a cathode-side terminal 42 for connecting an external circuit. Switches 43 and 44 are connected to the terminals 41 and 42, respectively. The positive electrode side of an auxiliary power source 45 is provided with two contacts A2 and B2 via a control circuit 46. The control circuit 46 includes a DC/DC converter and has the function of controlling the charging of the auxiliary power source. The negative electrode side of the auxiliary power source 45 is provided with two contacts A1 and B1. A load 47 is connected in parallel with the auxiliary power source 45.

In the fuel cell system as shown in FIG. 3, when the fuel cell generates power, the switches 43 and 44 are connected to the contacts A1 and A2, respectively. When the fuel cell is activated, the switches 43 and 44 are connected to the contacts B2 and B1, respectively.

Examples of the present invention are now described.

EXAMPLE 1

Activation of a unit cell of a DMFC using methanol as the fuel is described as an example of the present invention based on FIG. 1.

First, cathode catalyst particles were prepared by placing 50% by weight of platinum on conductive carbon particles with a mean primary particle size of 30 nm. Anode catalyst particles were prepared by placing 50% by weight of platinum-ruthenium alloy in an atomic ratio of 1:1 on carbon particles which were the same as those of the above-mentioned carbon particles. Each of the cathode catalyst particles and the anode catalyst particles was dispersed in a diluted ethanol solution of a solid polymer electrolyte (Flemion (registered trademark), manufactured by Asahi Glass Co., Ltd.) with water, using a ultrasonic dispersing apparatus, and the resultant dispersion was subjected to a defoaming treatment. In this way, an anode catalyst paste and a cathode catalyst paste were prepared. The content of the solid polymer electrolyte in each paste was adjusted to 30% by weight.

Each paste was applied onto a 50 μm-thick polypropylene sheet with a bar coater, and was left at room temperature for one day for drying, to form an anode catalyst layer and a cathode catalyst layer. The polypropylene sheet with the anode catalyst layer and the polypropylene sheet with the cathode catalyst layer were placed on both sides of a solid polymer electrolyte membrane (Nafion (registered trademark) 117, manufactured by E.I. Dupont de Nemours and Company), respectively, and this was pressed by a hot press, to transfer the catalyst layers onto the polymer electrolyte membrane. Thereafter, the polypropylene sheets were removed. In this way, a membrane electrode assembly (MEA) was obtained. The catalyst layer was in the shape of a square of 5 cm, with an area of 25 cm².

Next, a carbon paper (TGP-H-090, manufactured by Toray Industries Inc.) was used as the substrate of the diffusion layer. This carbon paper was immersed in a diluted aqueous dispersion of a fluorocarbon resin (FEP dispersion ND-1, manufactured by Daikin Industries, Ltd.) with a desired concentration for 1 minute and then taken out. The resultant carbon paper was dried in a hot air dryer at 100° C. and baked in an electric furnace at 270° C. for 2 hours. At this time, the content of the fluorocarbon resin (water repellent material) in the carbon paper was 5% by weight.

Separators were made from 2 mm-thick graphite plates, and one face thereof was cut to form a fuel flow channel or an oxidant gas flow channel. The fuel flow channel was a serpentine flow channel that meandered in a 5 cm-square plane. For the oxidant gas flow channel, a plurality of bend-free, straight flow channels were formed in parallel. Each of the fuel and oxidant gas flow channels had a square cross-section of 1 mm, i.e., its width and height were both 1 mm.

Current collector plates were made from 2 mm-thick copper plates, and their surfaces were plated with gold.

The carbon papers subjected to the water-repellent treatment were placed on both sides of the MEA, and the cathode-side separator and the anode-side separator were placed outside the carbon papers. At this time, the fuel or oxidant gas flow channel of the separators was brought into contact with the carbon paper. These separators were sandwiched between a pair of current collector plates and then a pair of 10 mm-thick stainless steel end plates with bolt holes, and the end plates were secured together with bolts, nuts and springs.

The cell assembled in the above manner was connected to an AC resistance meter (impedance meter Model 3566, manufactured by Tsuruga Electric Corporation) capable of measuring internal resistance at 1 kHz by a 4-terminal method, and changes in internal resistance caused by an activation treatment were measured. The internal resistance of the cell upon its assembly was 120 mΩ.

First, using a tubular pump in an environment of 25° C., distilled water was supplied to the anode at a flow rate of 2 cc/min, to exhaust the inner air. Simultaneously, using a mass flow controller, unhumidified nitrogen gas was supplied to the cathode at a flow rate of 200 cc/min, to replace the inner air. After 5 minutes, the internal resistance of the cell lowered to 52 mΩ.

Thereafter, using a heating wire and a temperature controller, the cell temperature was increased such that the separator temperature of the cell became 60° C. Further, the liquid supplied to the anode was changed from water to an aqueous methanol solution with a concentration of 2 mol/L, while maintaining the flow rate at 2 cc/min, and the amount of nitrogen supplied to the cathode was changed to 100 cc/min. It took 30 minutes for the temperature to become stabilized at 60° C. At this time, the internal resistance was 35 mΩ, and the voltage of the cell was 30 mV. The above-mentioned AC resistance meter was also capable of measuring voltage.

The positive electrode and the negative electrode of an external power source (DC power supply PAN 16-18A, manufactured by Kikusui Electronics Corporation) were connected to the anode and cathode of the fuel cell, respectively. The power source was adjusted so as to exert constant current control, and the current value was set to 1.0 A. When the passage of a current was started, the cell voltage was 0.34 V, but after 10 minutes it became 0.28 V, and the internal resistance of the cell lowered from 35 mΩ to 9.2 mΩ. Further, the current value was increased to 5.0 A and this current was passed for 10 minutes. At this time, the cell voltage was 0.4 V, which showed no large variation, and the internal resistance of the cell lowered from 9.2 mΩ to 6.5 mΩ. Thereafter, a current of 5.0 A was passed for 5 minutes, but the internal resistance was not observed to lower, so the passage of the current was terminated.

COMPARATIVE EXAMPLE 1

A unit cell having the same structure as that of Example 1 was produced. In the same manner as in Example 1, the anode and the cathode were supplied with water and nitrogen, respectively, for 5 minutes, to exhaust the air inside the cell. The internal resistance of the cell was 48 mΩ, which was equivalent to that of Example 1.

Thereafter, the anode was supplied with humidified hydrogen gas of 100% RH, which had been passed through a bubbler whose temperature was controlled at 60° C., not an aqueous methanol solution, whereas the cathode was supplied with humidified air of 60° C. and 100% RH, not nitrogen gas. In the same manner as in Example 1, the cell was connected to an external power source and was operated to generate power at 1.0 A for 10 minutes while supplying the hydrogen gas at 30 cc/min and the air at 100 cc/min, and then at 5.0 A for 10 minutes while supplying the hydrogen gas at 120 cc/min and the air at 400 cc/min. The internal resistance of the cell was then 10.7 mΩ. Since the internal resistance of the cell was higher than that of Example 1, the power generation at 5.0 A was continued. As a result, the internal resistance continued to lower for 10 hours and became constant at 6.6 mΩ.

The power generating characteristics of the DMFCs of the foregoing example and comparative example were compared. First, each cell was controlled such that its temperature was 60° C., using a heating wire and a temperature controller. The fuel cell was connected to a load apparatus (Electronic load PLZ164WA, manufactured by Kikusui Electronics Corporation). Under constant current control, the current value was changed such that the current density was stepped in increments of 10 mA/cm². At each current density, the same current value was maintained for 1 minute, and the voltage value after 1 minute was recorded.

As the fuel, an aqueous methanol solution of 2 mol/L was supplied at a flow rate of 2 cc/min with a tubular pump. Unhumidified air was supplied to the cathode through a mass flow controller. With respect to the flow rate thereof, the amount of air containing oxygen in an amount 5 times as much as the stoichiometric quantity derived from the reaction formula (6) at each current density was calculated, and the calculated amount was supplied.

$$3/2 O_2 + 6H^+ + 6e^- \rightarrow 3H_2O \qquad (6)$$

Figure 2:
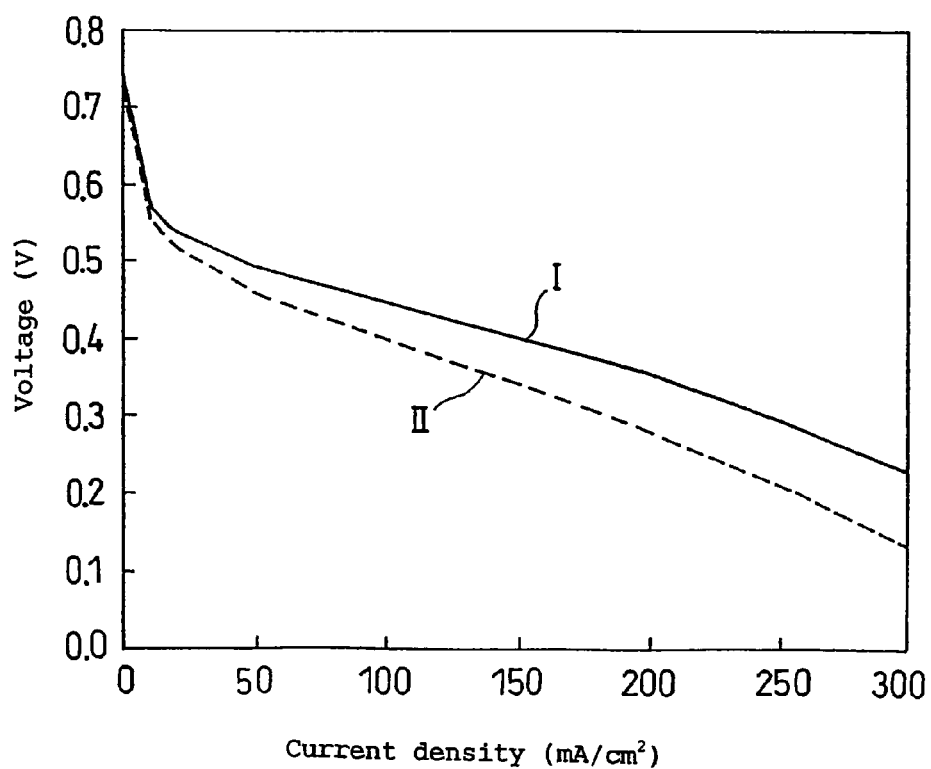
FIG. 2 is a graph showing the power generating characteristics of a fuel cell subjected to an activation treatment of the present invention and a fuel cell of a comparative example.

FIG. 2 shows the data obtained in the above test. The power generation characteristic curb of the cell activated according to Example 1 is represented by I, while the power generation characteristic curb of the cell activated according to Comparative Example 1 is represented by II.

As shown by FIG. 2, the cell activated according to Example 1 generally exhibits higher voltages and better power generating characteristics than the cell activated according to Comparative Example 1.

In order to clarify the reasons, after the completion of the power generation test, each cell was disassembled to sample its cathode catalyst layer, which was then immersed in ethanol and dispersed with an ultrasonic dispersing apparatus such that the electrolyte was dissolved in the ethanol and removed from the catalyst particles. Thereafter, the catalyst particles were dried at room temperature or at reduced pressure for 24 hours, and the amounts of carbon monoxide adsorbed on the particles were compared. The amounts of carbon monoxide adsorption were measured with R-6105 manufactured by Ohkura Riken Co., Ltd. As a result, it was found that the amount of carbon monoxide adsorbed on the catalyst particles taken from the cell activated according to Example 1 was 70% greater than that from the cell activated according to Comparative Example 1. Also, the amount of carbon monoxide adsorbed on the catalyst particles taken from the cell activated according to Comparative Example 1 was equivalent to that taken from a cell that was not activated. The catalyst sample of this non-activated cell was taken from a catalyst layer that was hot-pressed onto an electrolyte membrane, and the electrolyte was removed from this catalyst sample in the same manner.

From the foregoing, it has been found that the activation method of the present invention requires a shorter time to hydrate an electrolyte membrane than conventional activation methods such as the one represented by Comparative Example 1, and in addition, it increases the number of active sites of a cathode catalyst, thereby producing the effect of improving the power generating characteristics of a fuel cell.

EXAMPLE 2

As an example of the present invention based on Embodiment 2, activation of a unit cell of a DMFC using methanol as the fuel is described with reference to FIG. 3.

First, MEAs which were the same as those of Example 1 were assembled. Eight MEAs and separators were alternately stacked, to form a cell stack. The separator interposed between the MEAs is a separator serving as both a cathode-side separator and an anode-side separator, which has a fuel flow channel on one side and an air flow channel on the other side.

Two lithium ion batteries of 18650 size, which are commercially available, were connected in series, to be used as the auxiliary power source 45. The fuel cell stack 40 was connected to the auxiliary power source 45, as illustrated in FIG. 3. The lithium ion batteries had been charged fully with another charger before they were incorporated into the circuit. The circuit which controlled the charging of the lithium ion batteries was a circuit designed for charging a notebook personal computer.

This fuel cell stack was subjected to an activation treatment.

First, the internal resistance at 1 kHz was measured with the same AC resistance meter as the above-mentioned one, and the internal resistance of the fuel cell stack was 840 mΩ. Using a tubular pump in an environment of 25° C., distilled water was supplied to the anode of each unit cell at a flow rate of 2 cc/min, to exhaust the inner air. Simultaneously, using a mass flow controller, unhumidified nitrogen gas was supplied to the cathode of each unit cell at a flow rate of 200 cc/min, to replace the inner air. This operation was performed for 5 minutes.

Thereafter, using a heating-wire and a temperature controller, the temperature of the stack was increased such that the temperature of the separator of the innermost cell was 60° C. Further, the liquid supplied to the anode of each unit cell was changed from water to an aqueous methanol solution with a concentration of 2 mol/L while maintaining the flow rate at 2 cc/min, and the amount of nitrogen supplied to the cathode of each unit cell was changed to 100 cc/min.

Next, with the switches 43 and 44 in FIG. 3 connected to B2 and B1, respectively, an activation treatment was performed for 10 minutes. The DC/DC converter was controlled such that the voltage applied across the fuel cell was 2.4 V. When the passage of a current was started, the current flowing through the stack was approximately 30 mA/cm² when it was converted to current density, but after 10 minutes it became approximately 50 mA/cm², and the internal resistance of the stack lowered from 265 mΩ to 68 mΩ. Further, with the voltage changed to 3.2 V, the current was passed for 10 minutes. At this time, the current density was approximately 200 mA/cm², which showed no large variation, and the internal resistance lowered from 68 mΩ to 47 mΩ. Then, the current was passed for 5 minutes, but the internal resistance was not observed to lower, so the passage of the current was terminated.

Thereafter, in order to eliminate the influence from the auxiliary power source and the load, the fuel cell stack was disconnected from the circuit and examined for its power generating characteristics. First, using a heating wire and a temperature controller, the stack was controlled such that the temperature of the middle unit cell was 60° C. The stack was connected to the same load apparatus as the above-mentioned one. Under constant current control, the current value was changed such that the current density was stepped in increments of 10 mA/cm². At each current density, the same current value was maintained for 1 minute, and the voltage value after 1 minute was recorded.

As the fuel, an aqueous methanol solution of 2 mol/L was supplied to each unit cell at a flow rate of 2 cc/min with a tubular pump. Unhumidified air was supplied to the cathode of each unit cell, using a mass flow controller. With respect to the flow rate thereof, the amount of air containing oxygen in an amount 5 times as much as the stoichiometric quantity derived from the reaction formula (7) at each current density was calculated, and the calculated amount was supplied.

$$3/2 O_2 + 6H^+ + 6e^- \rightarrow 3H_2O \qquad (7)$$

Each cell was connected with a voltage measurement probe, and its data was recorded by Memory Hicorder 8420 manufactured by Hioki E.E. Corporation. The power generating characteristics of the stack obtained are represented by III of FIG. 4. The voltage values divided by the number of stacked cells, i.e., 8 were in good agreement with the data represented by I of FIG. 2.

Thereafter, the switches 43 and 44 of the fuel cell stack 40 were connected to the contacts A1 and A2, respectively, and the same load apparatus as the above-mentioned one was connected as the load 47. Under such conditions, the fuel cell stack was operated at an output of 10 W for 8 hours per day for 1 month, and then the operation was stopped for 1 month.

Figure 4:
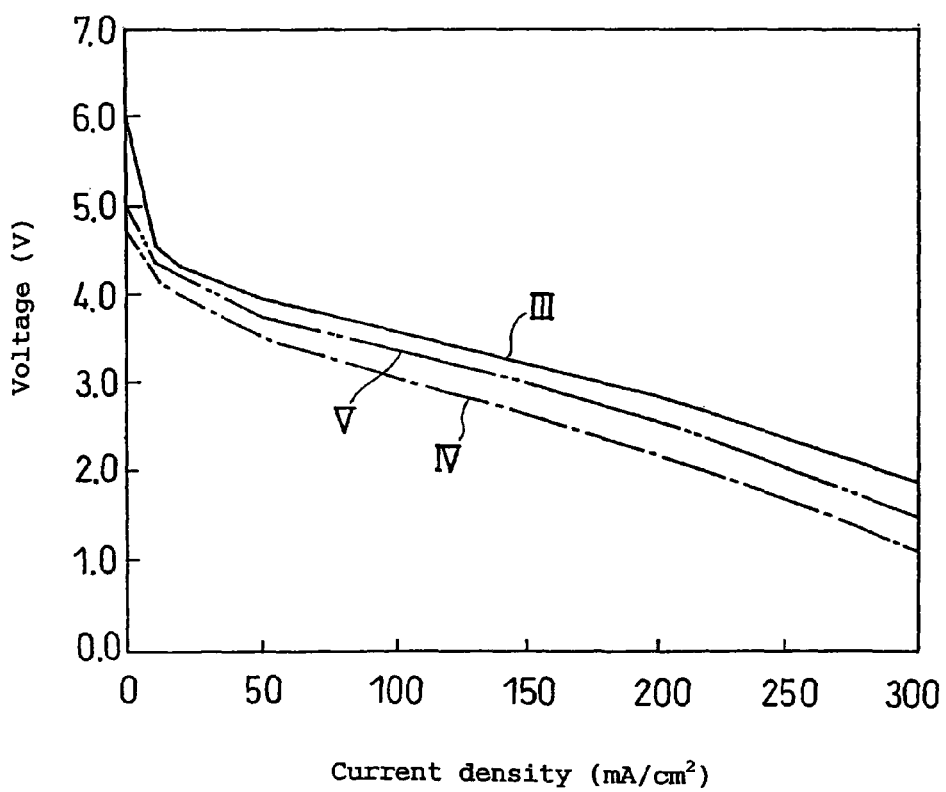
FIG. 4 is a graph showing the power generating characteristics that represent the effects of an activation treatment according to another embodiment of the present invention.

The fuel cell stack was again disconnected from the circuit and subjected to a power generation test under the same conditions as those when the data represented by III of FIG. 4 was obtained. As a result, as shown by IV of FIG. 4, the power generation characteristics were clearly lower than those immediately after the assembly of the stack.

The fuel cell stack 40 was reconnected to the circuit. With the switches 43 and 44 in FIG. 4 connected to the contacts B2 and B1, respectively, an activation treatment was performed for 10 minutes. The DC/DC converter was controlled such that the voltage across the fuel cell was 2.0 V.

Again, the fuel cell stack was disconnected from the circuit and subjected to a power generation test under the same conditions as those when the data represented by III of FIG. 4 was obtained. The results are shown by V of FIG. 4. Although the power generating characteristics did not recover to those represented by III, an improvement in the power generating characteristics was observed.

The fuel cell to which the present invention is applied is useful as the power source for portable small-sized electronic devices, such as cellular phones, personal digital assistants (PDAs), notebook personal computers, and video cameras. It is also applicable to such applications as the power source for electric scooters.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for activating a direct oxidation fuel cell comprising an anode, a cathode, and a proton-conductive electrolyte membrane interposed between the anode and the cathode, said anode and said cathode each having a catalyst layer on a face in contact with said proton-conductive electrolyte membrane, said method comprising passing a current through said fuel cell from an external power source, with a positive electrode and a negative electrode of said external power source connected to said anode and said cathode of said fuel cell, respectively, while supplying an organic fuel and an inert gas to said anode and said cathode, respectively, wherein:

said inert gas flows through said cathode during the passing of the current through said fuel cell, voltage applied from said external power source to said fuel cell in order to pass a current through said fuel cell is sufficient to transfer protons generated at said anode to said cathode but insufficient to oxidize anode material, said voltage for activating the cathode is less than 0.5 V, and said catalyst layer of the anode contains ruthenium.

* * * * *